(12) United States Patent
Lee et al.

(10) Patent No.: US 9,251,320 B2
(45) Date of Patent: Feb. 2, 2016

(54) MATCHED CONTENT USE RESTRICTION SYSTEM

(71) Applicant: Verizon New Jersey Inc., Newark, NJ (US)

(72) Inventors: Woo Beum Lee, Basking Ridge, NJ (US); Jeffrey M. Walsh, Verona, NJ (US)

(73) Assignee: Verizon New Jersey Inc., Newark, NJ (US)

( * ) Notice: Subject to any disclaimer, the term of this patent is extended or adjusted under 35 U.S.C. 154(b) by 169 days.

(21) Appl. No.: 13/906,915

(22) Filed: May 31, 2013

(65) Prior Publication Data

US 2014/0359786 A1 Dec. 4, 2014

(51) Int. Cl.
*G06F 21/10* (2013.01)

(52) U.S. Cl.
CPC .............. *G06F 21/10* (2013.01); *H04L 2209/60* (2013.01); *H04L 2209/605* (2013.01)

(58) Field of Classification Search
CPC ................. H04L 2209/605; H04L 2209/60; G06F 21/60
USPC ................... 726/27, 26, 30, 31, 32, 33
See application file for complete search history.

(56) References Cited

U.S. PATENT DOCUMENTS

| 5,629,980 | A * | 5/1997 | Stefik | G06F 21/10 |
| | | | | 705/54 |
| 2002/0120586 | A1* | 8/2002 | Masaki | G06Q 20/401 |
| | | | | 705/75 |
| 2004/0125982 | A1* | 7/2004 | Kacker et al. | 382/100 |
| 2005/0197964 | A1* | 9/2005 | Duggan | 705/57 |
| 2008/0013829 | A1* | 1/2008 | Stebbings | 382/172 |
| 2008/0144883 | A1* | 6/2008 | Kacker et al. | 382/100 |
| 2009/0196465 | A1* | 8/2009 | Menon | G06F 21/10 |
| | | | | 382/118 |
| 2011/0202968 | A1* | 8/2011 | Nurmi | G06F 21/10 |
| | | | | 726/1 |

* cited by examiner

*Primary Examiner* — Jung Kim
*Assistant Examiner* — Thomas Ho

(57) ABSTRACT

A system may be configured to receive an upload, from a first user device, of a basis content item that includes first content; determine whether a first user of the first user device has a right to restrict a use of the first content in an in-use content item uploaded by a second user device when the in-use content includes the first content; in response to determining that the first user has the right, store the basis content in the system; in response to determining that the first user does not have the right, discard the basis content; receive an upload, from a second user device, of a first in-use content item; and determine whether the first in-use content item matches the basis content item.

20 Claims, 9 Drawing Sheets

MATCHED CONTENT USE RESTRICTION SYSTEM

BACKGROUND

Due to advances in technology, it has become increasingly easy to generate content. For example, desktop publishing software allows graphics artists, designers, office workers, students, business owners, etc. to produce high quality photographs, posters, web pages, slide presentations, reports, and even videos. However, the ease with which one can create content also has led to increased public concerns over unauthorized use of content and related legal issues, such as copyright violations, privacy issues, etc. This in turn has led to development of a wide-range of techniques for protecting content-use rights.

DETAILED DESCRIPTION

The following detailed description refers to the accompanying drawings. The same reference numbers in different drawings may identify the same or similar elements. As used herein, the terms "user," "consumer," "subscriber," "party," and/or "customer" may be used interchangeably. Also, the terms "user," "consumer," "subscriber," "party," and/or "customer" are intended to be broadly interpreted to include a user device or a user of a user device.

As used herein, the term "content" may refer to pictures, photographs, drawings, written documents (in electronic form), movies, videos and/or audio clips.

As described below in detail, a user may register with a matched content use restriction system. After the registration, the user may upload a content item, what may be used by the system as a basis for restricting other users from using content that matches the content of the uploaded item.

Figure 1:
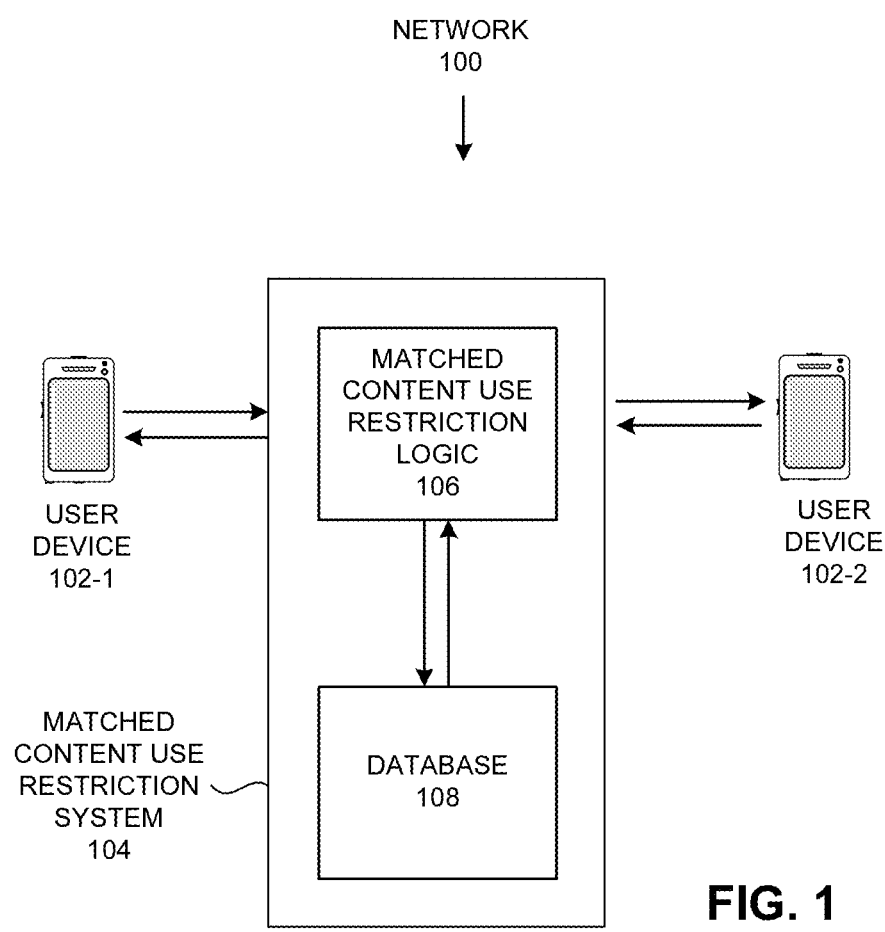
FIG. 1 illustrates an overview of the concepts described herein.

FIG. 1 illustrates an overview of the concept. As shown, an environment 100 may include a user device 102-1, a user device 102-2, and a matched content use restriction system 104. In some implementations, matched content use restriction system 104 may include or may be part of a social media application that allows a user to upload content, publish the content, and/or share the content with other users. For example, a user may upload a picture or a song to matched content use restriction system 104 and share the picture or the song with other users of matched content use restriction system 104.

In a typical use-case scenario, a user at user device 102-1 may register with a matched content use restriction system 104. After the registration, the user may upload a content item to system 104, which may then store the uploaded content in a database 108.

Once the content item has been uploaded and stored in database 108, matched content use restriction logic 106 may restrict other users from using content that matches content of the uploaded content item. For example, matched content restriction logic 106 in system 104 may compare the content stored in database 108 to other content uploaded to system 104 by, for example, a user of user device 102-2. If the content in database 108 matches the content uploaded via user device 102-2, system 104 may restrict the use of the content uploaded via user device 102-2. The restriction may include, for example, allowing the user of user device 102-1 to modify the content uploaded by the user of user device 102-2 (e.g., blurring an image, watermarking the image, replacing a portion of the image with another image, etc.), preventing the content uploaded via user device 102-2 from being published or shown to additional users, etc.

Figure 2:
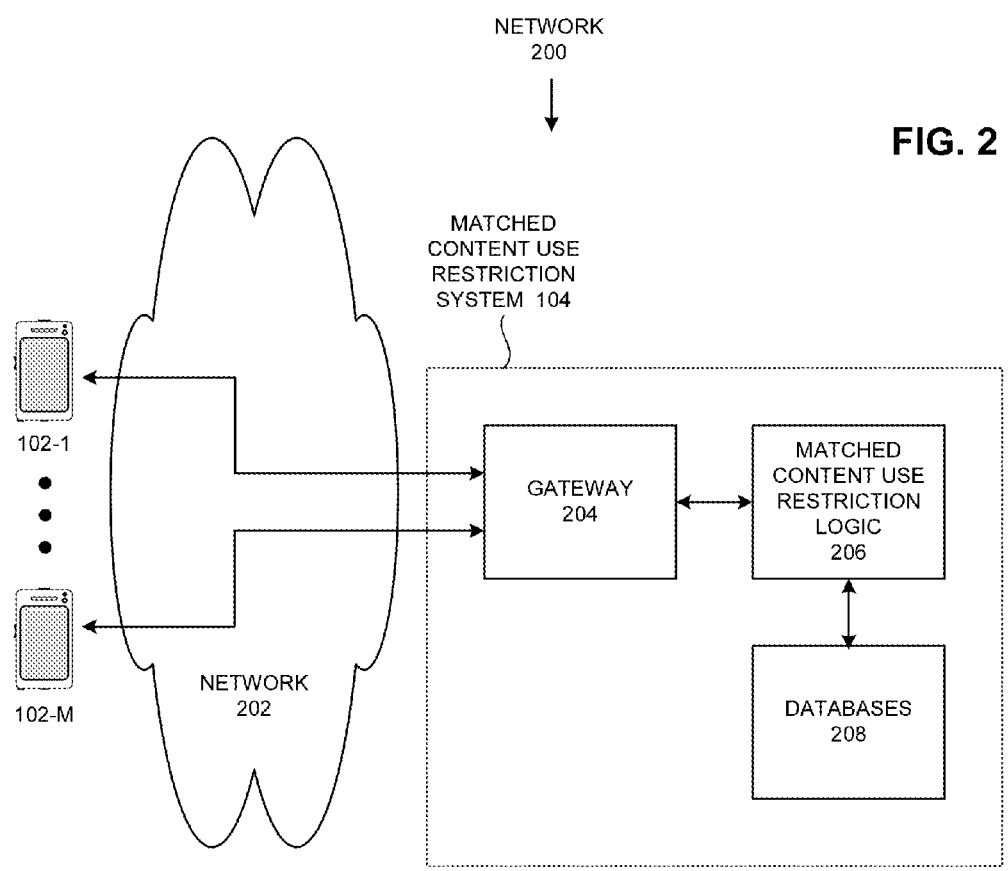
FIG. 2 illustrates an exemplary network in which the concepts described herein may be implemented.

FIG. 2 illustrates an exemplary network 200 in which the concepts described herein may be implemented. As shown, network 200 may include network 202, user devices 102-1 through 102-N (collectively referred to as "user devices 102" and individually as "user device 102"), and matched content use restriction system 104.

Network 202 may include one or more packet switched networks, such as an Internet protocol (IP) based network, a local area network (LAN), a wide area network (WAN), a personal area network (PAN), an intranet, the Internet. Network 202 may also include one or more public switched telephone networks (PSTNs) or a switched network (e.g., an optical network). Network 202 may also include a number of transmission towers for receiving wireless signals and forwarding the signals toward the intended destination, and yet another type of network (e.g., a satellite-based network) that is capable of exchanging information.

User device 102 may include a handset, cellular phone, smart phone, personal computer, laptop computer, tablet computer, set-top box, gaming console, personal digital assistant (PDA), smart television (TV), and/or another type of communication and/or computational device that is capable of receiving and sending information/data.

Matched content use restriction system 104 may receive requests for registration from user devices 102. Upon receipt of such a request, marched content use restriction system 104 may register the user. Once a user has been registered, matched content use restriction system 104 may allow a user to upload content items. Matched content use restriction system 104 may use each of the uploaded content item to prevent other users from using content that matches the uploaded content (i.e., "similar content").

As further shown in FIG. 2, matched content use restriction system 104 may include a gateway 204, matched content use restriction logic 206, and databases 208. Gateway 204 may include one or more devices via which information/data external to system 104 may communicate with devices/components in system 104. For example, gateway 204 may include a firewall, a load balancer, a network address translator (NAT), an application layer gateway, etc.

Matched content use restriction logic 206 may perform much of the logic in matched content use restriction system 104. As described below, matched content use restriction logic 206 may include additional components/logic that are associated with registration of users, restriction of the use of content, and/or administration of system 104 (e.g., setting user preferences, defining rules for restricting other users' use of uploaded content, etc.).

Databases 208 may store information such as user registration information, uploaded content from users (both content that is to be used as a basis for restricting use, as well as content whose use is to be restricted), and other information, as described below.

In FIG. 2, network 200 is illustrated for simplicity. Depending on the implementation network 200 may include additional, fewer, different, or a different arrangement of devices, network elements, and networks than those illustrated in FIG. 2. For example, network 200 may include thousands, millions, or tens of millions of user devices 102. In another example, matched content use restriction system 104 may include one or more gateways 204, matched content use restriction logic 206, and/or databases.

Although shown as separate devices, in some implementations, the functionalities of devices 204, 206, and 208 may be distributed/implemented over additional devices/network(s). For example, in the functionalities of devices 204-208 may be distributed over many devices in a cloud network or devices that span various intra-corporate department devices (e.g., devices in an accounting department, legal department, etc.).

In some implementations, the functionalities of devices 204-208 may be combined into two or, even a single device. For example, in one implementation, the functionalities may be implemented as virtual machines on a single physical device.

In FIG. 2, network 200 is illustrated as including user devices 102, network 202 and matched content use restriction system 104. Although not shown, however, network 200 may include many more network components or devices, such as routers, switches, bridges, terminals, additional gateways, etc. These devices are not illustrated in FIG. 2 for simplicity.

Figure 3:
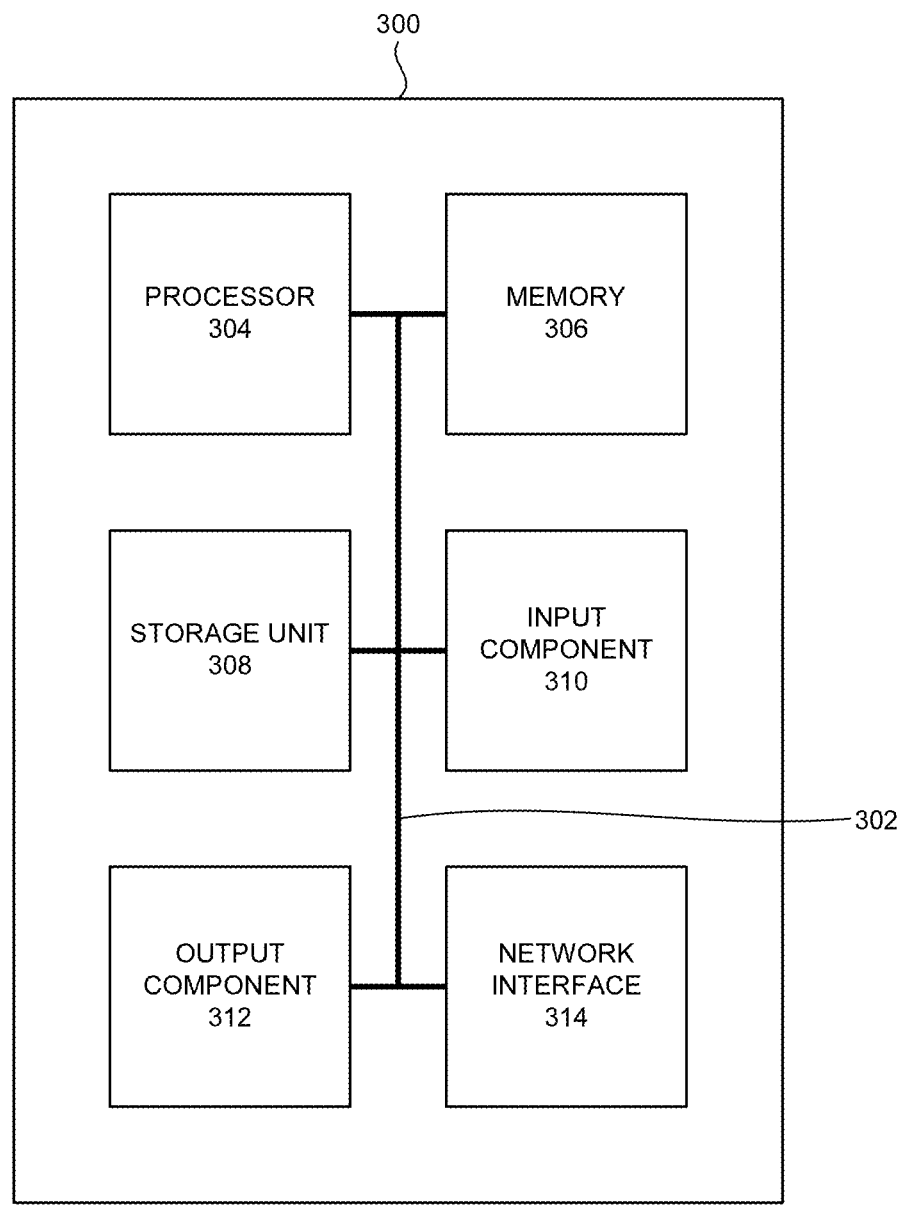
FIG. 3 is a block diagram of exemplary components of a network device of FIG. 2.

FIG. 3 is a block diagram of exemplary components of a network device 300. Each of the devices in FIG. 2 may include one or more network devices 300. As shown, network device 300 may include a communication path 302, processor 304, memory 306, storage unit 308, input component 310, output component 312, and network interface 314. In different implementations, network device 300 may include additional, fewer, different, or a different arrangement of components than the ones illustrated in FIG. 3. For example, network device 300 may include line cards for connecting to external buses.

Communication path 302 may provide an interface through which components of network device 300 can communicate with one another. Processor 304 may include a microprocessor (e.g., a single core, a dual core, a quad core, etc.), an Application Specific Integrated Circuit (ASIC), a Field Programmable Gate Array (FPGA), and/or other processing logic (e.g., embedded devices) capable of controlling network device 300.

Memory 306 may include static memory, such as read only memory (ROM), and/or dynamic memory, such as random access memory (RAM), or onboard cache, for storing data and machine-readable instructions (e.g., programs, scripts, etc.). Storage unit 308 may include a floppy disk, CD ROM, CD read/write (R/W) disc, and/or flash memory, as well as other types of storage devices (e.g., hard disk drive) for storing data and/or machine-readable instructions (e.g., a program, script, etc.). Depending on the context, the term "memory," "storage," "media," "storage device," and/or "storage unit" may be used interchangeably. For example, a "computer-readable storage device" or "computer readable medium" may refer to a memory and/or storage device.

Input component 310 and output component 312 may provide input and output from/to a user to/from network device 300. Input/output components 310 and 312 may include a display screen, a keyboard, a mouse, a speaker, a microphone, a camera, a DVD reader, Universal Serial Bus (USB) lines, and/or other types of components for converting physical events or phenomena to and/or from signals that pertain to network device 300.

Network interface 314 may include a transceiver (e.g., a transmitter and a receiver) for device 300 to communicate with other devices and/or systems. For example, via network interface 314, network device 300 may communicate over a network, such as the Internet, an intranet, a terrestrial wireless network (e.g., a WLAN, WiFi, WiMax, etc.), a satellite-based network, optical network, etc. Network interface 314 may include a modem, an Ethernet interface to a LAN, and/or an interface/connection for connecting network device 300 to other devices (e.g., a Bluetooth interface).

Network device 300 may perform the operations described herein in response to processor 304 executing software instructions stored in a non-transient computer-readable medium, such as memory 306 or storage unit 308. The software instructions may be read into memory 306 from another computer-readable medium or from another device via network interface 314. The software instructions stored in memory 304 or storage unit 308, when executed by processor 304, may cause processor 304 to perform processes that are described herein.

Figure 4:
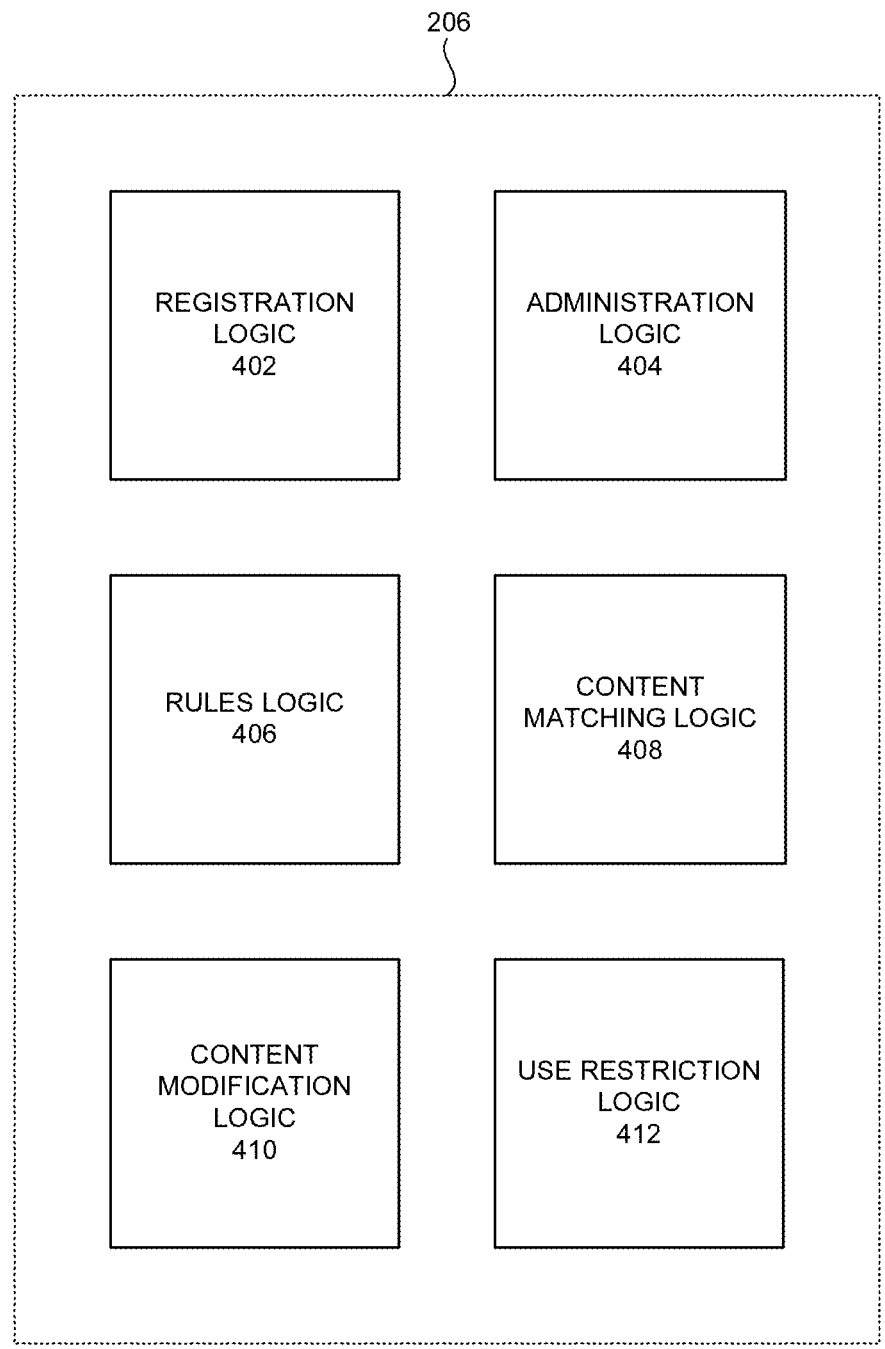
FIG. 4 is a block diagram of exemplary components of the matched content use restriction logic of FIG. 2.

FIG. 4 is a block diagram of exemplary components of matched content use restriction logic 206. As shown in FIG. 4, matched content use restriction logic 206 may include registration logic 402, administration logic 404, rules logic 406, content matching logic 408, content modification logic 410, and use restriction logic 412.

Registration logic 402 may receive registration input from user device 102. For example, in one implementation, a user may provide, via a browser on user device 102, the registration information to registration logic 402. Registration logic 402 may store the registration information in databases 208. In some implementations, registration logic 404 may allow the user to register for free and/or for a fee.

In other implementations, registration logic 402 may allow a user to register for different levels of matching content restriction services. Each level of service may allow the user to restrict other users from: using different types of matching content (e.g., audio, video, document, 3D data (see below), etc.); and using content differently (e.g., publication at a social media application/service that includes the matched content use restriction system 104).

In some of these implementations, each level of service may allow the user to restrict other users in different ways. For example, in one implementation, after uploading a basis content item, the user may simply ban other users' content that matches the content of the basis content item. In another example, in another implementation, the user may be allowed to modify other users' content that matches the content of the basis content item (e.g., watermark the content, doctor the content, etc.). The modification may be automated, or alternatively, manual.

In the manual case, when matched content use restriction logic 206 detects another user's content item that matches the basis content, matched content use restriction logic 206 may notify the user that a matching content item has been found.

The user may be given an option to modify the matched content item (e.g., blur the content item).

Depending on the level of service, a user may: (1) ban the use of matching content items; (2) modify the matching content items; (3) license the matching content items to other users. The license may come in one of many flavors (e.g., a restriction on the number of people to which the matched content item can be distributed; whether derived content can be distributed to other users; the number of times the matched content can be sublicensed; etc.).

Administration logic 404 may receive user input from user device 102 for administering user account, user preferences, and rules for restricting content use. The administration of user account may include resetting passwords, user identifier (Id), email addresses, user addresses, user information (e.g., gender, age, birthday, etc.).

The user preferences may include settings that are associated with restricting other users from using matching content. For example, in one implementation, the user preferences may be set so that a matching operation (for detecting other users' content that matches the user's basis content) is performed only for visual content, audio content, and or the combination of both.

In some implementations, the uploaded basis content may be a three-dimensional (3D) data of the user's appearance (e.g., user's head, face, body, etc.) or another object. For these cases, the user may set the preferences so that if other users' in-use content matches an image obtained by projecting the object represented by the data onto a particular viewing plane, other users' content use may be restricted. In still some of these implementations, administration logic 404 may give the user an option for uploading 3D data directly from another application, or alternatively, an option to input such data via another user interface.

Administration logic 404 may allow a user to set the preference for restricting the use of other users' matching content that was uploaded before/after the upload of a basis content item. If the preference is set to restrict other users' content that was uploaded before the upload of the basis content item, matched content use restriction logic 206 may initiate a scheduled job that systematically looks up web content within the social media system that includes matched content use restriction logic 206 (or alternatively, published content within matched content use restriction logic 206), and to apply procedures for restricting each in-use content item whose content matches that of the basis content item. If the preference is set to restrict other users' content that is uploaded after the upload of the basis content item, matched content use restriction logic 206 may compare each in-use content item that is uploaded after the basis content item to the basis content item. If there is a sufficient match, matched content use restriction logic 206 may follow steps for restricting the use of the matched in-use content item.

Administration logic 404 may allow users to set preferences for restricting the use of matched in-use content. For example, a user may choose to restrict the use of the matched content by (1) banning the matched content item; (2) modify the matched content item; or (3) sell a right to use the matched content item to the user that uploaded the matched content item, etc. For example, assume that a user of user device 102-1 has uploaded a revealing picture of herself as a basis content item. When matched content use restriction system 104 detects a matching content item uploaded by the user of user device 102-2, matched content use restriction logic 206 sends an offer to license the content to the user of user device 102-2. The user may offer, for a fee: (1) the right to publish the matched content to a restricted group of people (e.g., friends of the user of user device 102-2, acquaintances of the user of user device 102-2, relatives of the user of user device 102-2, family members of the user of user device 102-2, etc.); (2) the right to modify the matched content; or (3) the right to resell or relicense the matched content; etc.

Administration logic 404 may allow a user to upload a basis content item. Depending on the implementation, administration logic 104 may apply different criteria in approving or validating the uploaded candidate content item as a basis content item.

One criterion for validating a candidate content item as a basis content item may include, for example, whether the user can supply additional support documents that indicate whether the candidate document "belongs" to the user (e.g., an image of the user). For example, a candidate content item may be approved as a basis content when matched content use restriction logic 206 verifies that an uploaded image (as a candidate content item) matches an image of the user on the user's driver's license.

Another criterion for validating a candidate content item as a basis content item may be that the candidate content item is "first to be uploaded." In this case, when a user uploads a candidate content item, administration logic 404 may search its basis content database (e.g., basis content database 504 in FIG. 5) to determine whether a matching basis content item already exists. If no such item exists, matched content use restriction logic 206 may approve the candidate content item as a basis content item. If a matching item exists, matched content use restriction logic 206 may reject the candidate content item.

In a different implementation, administration logic 404 may allow multiple, similar basis content items to co-exist, depending on different levels of services that are offered by matched content use restriction logic 206 (e.g., a non-exclusive right to prevent others using matched content items, etc.).

Administration logic 204 may allow a user to select different geographical area and time duration for which the restriction may apply. For example, administration logic 204 may indicate that the user may restrict the use of content for the next 12 months in California. These restrictions may be set in combination with other types of restrictions (e.g., restrictions on licensing a content item to friends, colleagues, relatives, family members, users that are below or above certain age, a specific group of people (e.g., people of a given gender, sexual orientation, political orientation, earnings potential, a religion, an ethnicity, etc.). For example, a user may restrict the public at large from viewing/hearing private pictures/conversations, but allow the user's family members to access the content. A user may feel that a content item may be offensive for viewing by a group of users.

Rules logic 406 may allow a user to create, delete and or edit different rules for restricting the use of content items. Although preferences and settings associated with different levels of services allow a user to restrict different groups of users based on different criteria for different basis content items, in certain situations, this may be insufficient for certain situations. For example, a user may want to restrict the use of content items that match a content items that belong to a specific class defined by the user. In these situations, the procedures for matching content need to be applied to a class of content, rather than to a single content item. In such situations, the procedures for matching content items need to be defined by rules that the user creates via rules logic 406.

For example, assume that a user has a collection of images that are classified as bathtub images, and the user wishes to license the use of the matching images (e.g., doctor the images). Via rules logic 406, the user may define a rule that specifics the following: if an in-use image matches one of the bathtub images, the owner of the in-use image is to be offered a chance to license the image. The user may activate the rule, and apply the rule.

Content matching logic 408 may include one or more modules for comparing a basis content item to another content item in databases 208. For example, content matching logic 408 may compare one image to another image, one audio clip to another audio clip, one video clip to another video clip, one document to another document e.g., page to page), one web page to another web page (e.g., as images or text files), etc.

In another example, content matching logic 408 may determine whether 3D data defines a 3D object whose projected image is similar to an in-use image. In such an instance, content matching logic 408 may obtain a projection of the 3D object (represented by the data) onto a 2D plane, and determine whether the projected image is similar to the in-use image. For example, assume that a user has input 3D data that represents the user's head. Content matching logic 408 may determine whether a 2D image of the head (obtained from the 3D data via projection) matches an in-use image of the head uploaded by another user. This feature may be used by a user to prevent other users from using the user's image.

Similarly, content matching logic 408 may determine whether basis audio data (3D audio data), stereo audio data, transformed audio data, etc., matches audio data uploaded by other users. Different transformation techniques may be applied to the contents of different types (e.g., documents, text, videos, etc.) to compare the contents.

Content matching logic 408 may apply different techniques for matching contents in different formats. For example, a document may be a TIFF, PNG, PDF, DOC, DOCX, rich text, EPS, MPEG, GIF, AVI, PPT, etc. For each of these file types, content matching logic 408 may provide conversion mechanisms, to convert data of one format into another format most suited for matching two content items.

In some instances, a basis content item may include text, and an in-use content item may include an image. In such an instance, content matching logic 408 may apply an optical character recognition to the image, to obtain a text version of the image before comparing the basis content item to the in-use content item.

Content modification logic 410 may include different processes/procedures/programs for modifying matching contents. The modifications may include inserting a watermark, replacing a portion of an image with another image, etc., changing the pitch of a voice, censoring a certain portion of an audio clip, etc.

Content modification logic 410 may apply different techniques for modifying contents in different formats. When a basis content item matches an in-use content item to a basis content item, content modification logic 410 may modify the in-use content item, in accordance with user preferences, rules, etc.

For example, assume that a basis content item and an in-use content item are text documents. Also assume that matched content use restriction logic 206 matches a portion of the text in the basis content item to a portion of text in the in-use content item. In such an instance, matched content use restriction logic 206 may blank out the matched text in the in-use content item. The process for modifying an in-use content item can become more complex, when the formats of the basis content document and in-use document differ (e.g., a basis content document is a text file and an in-use content item is a GIF file).

Use restriction logic 412 may enforce restrictions in accordance with user preferences, settings, rules logic 406, content matching logic 408, and content modification logic 410. As indicated above, use restriction logic 412 may apply restrictions to content that was uploaded prior to the upload of a basis content item and/or content that is uploaded after the upload of the basis content item.

Depending on the implementation, matched content use restriction logic 206 may include additional, fewer, different, or a different arrangement of logic components than those illustrated in FIG. 4. In some implementations, matched content use restriction logic 206 may take the form of an application server, and logic components 402-406 may take the form of servlets and/or enterprise Java beans. In such embodiments, both the servlets and the enterprise Java beans would reside in web container(s). In other implementations, matched content use restriction logic 206 may be implemented as another type of server application with components that correspond to logic 402 through logic 412.

Figure 5:
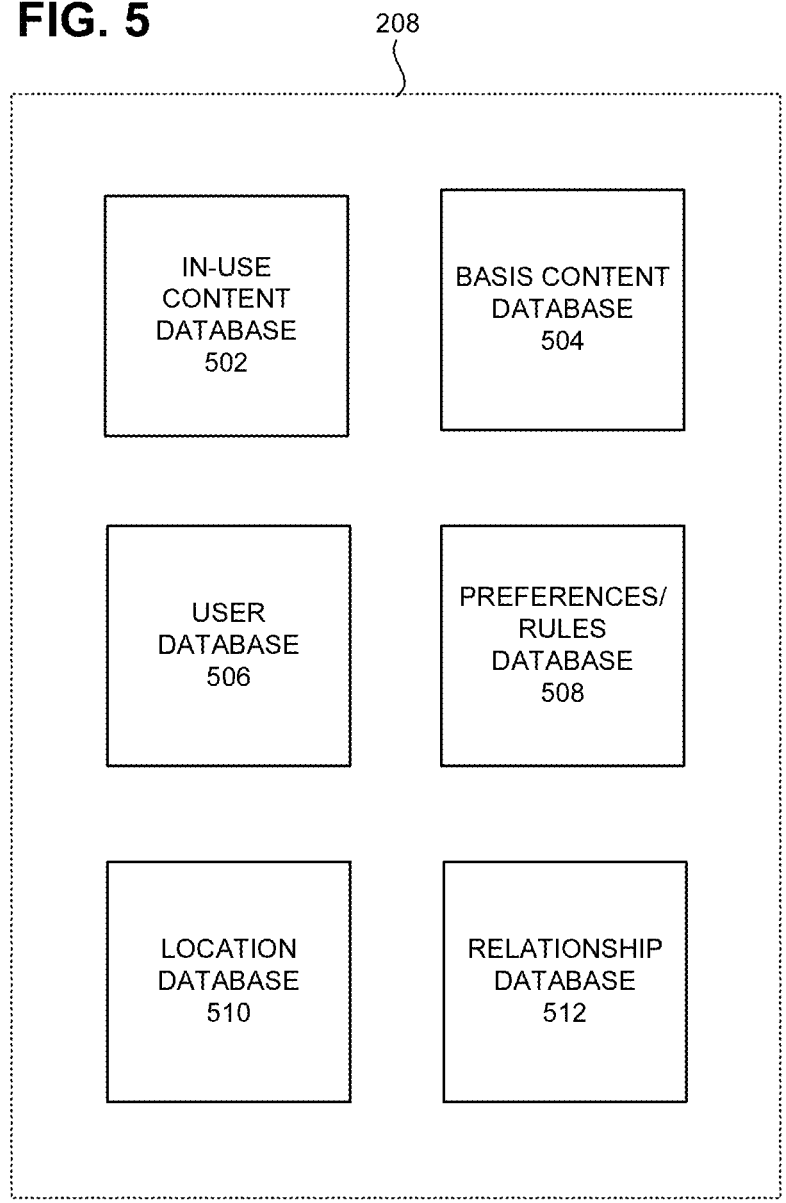
FIG. 5 illustrates exemplary components of the databases of FIG. 2.

FIG. 5 illustrates exemplary components of databases 208. As shown, databases 208 may include an in-use content database 502, basis content database 504, user database 506, preferences/rules database 508, location database 510, and relationship database 512.

In-use content database 502 may include content uploaded by users in matched content use restriction system 104 or a social media application/system (which is associated with in-use content database 502) to share with other users. Basis content database 504 may include content items that are uploaded by registered users, in order to restrict content use by other users based on the uploaded content items.

In some implementations, basis content database 504 may be seeded with widely used content not owned by anyone (or should not be owned by anyone), such as public domain works. When a user uploads a content item (as a candidate for being validated as a basis content item), matched content use restriction logic 206 may compare the candidate to a seed content item already in basis content database 504. If there is a match, the candidate content item is prevented from being validated as a new basis content item. That is, the seeds prevent validation of candidates that include widely used content, and therefore, prevent users from restricting the use of such content.

For example, the seed content may include images of person, places or things that are widely used/known; songs whose copyrights have expired; or works of well-known literature. In some implementations, the seed content may include images of public figures (e.g., presidents, queens, kings, celebrities, etc.), products, art work, etc.

Both in-use content database 502 and basis content database 504 may include: images of a person, a place or a thing (e.g., a user's face, images of a building, landmark, monument, personal belongings; etc), audio clips of a user's voice, a song (e.g., sung by the user), music, a video clip; a text document; 3D data; etc. The content items may be in different file formats, such as a PDF, DOCX, PPT, EPS, AI, TXT, GIF, TIFF/TIF, PNG, HTML, XML, MPEG, JPEG, etc.

User database 506 may include information users registered to matched content use restriction system 104 and/or users registered to a social media application/system associated with matched content use restriction system 104. User database 506 may include personal information, such as user name, user address, phone number, etc. In some implementations, user database 506 may also include billing information, such as a credit card number, billing address, account/billing history, information indicating what specific level of service the user subscribed to, etc.

Preferences/rules database 508 may include user settings for restricting other users' use of matched content. As discussed above, given a particular user and a content item, the preferences may indicate settings associated with restricting other users' use with respect to geographical area, time, user type/group (e.g., a user's family members, relatives, friends, colleagues, acquaintances, public at large (in relation to the user, etc.), and content type (e.g., document, video, audio, photograph, picture, document, etc.).

Preferences/rules database 508 may also include settings that affect how use of a matched content item is to be restricted: whether the other user would be simply prevented from its use; whether the other user would be offered an opportunity to purchase a right to use the matched content item (and if so, what type of rights the other users may be offered to purchase, such as a right to produce derived work and to redistribute/sell such content, to redistribute the content to the public at large; etc.); whether the owner of the basis content would be offered an opportunity to modify the matched content; whether the use of matched content uploaded prior to/after the upload of the basis content is to be restricted; etc.

Preferences/rules database 508 may also include rules for matching a group of basis content item (owned by a registered user) to in-use content and restricting their use. These rules may specify conditions and restrictions to user groups/types that cannot be simply specified by changing user preferences and settings.

Location database 510 may include a database of registered user locations in real time, when possible. Location database 510 may include coordinates of a particular user based on satellite information, base station triangulation, etc. Information in location database 510 may be used to restrict the use of specific content at a specific location.

For example, assume that a user is at a particular restaurant, and the restaurant owner is registered at matched content use restriction system 104. Via matched content use restriction logic 206, the restaurant owner has set his user preferences so that other users are prevented from uploading pictures of his cuisine (e.g., to prevent his competitors from copying his artistry in presenting a particular dish). When a customer takes a picture of his dessert item and attempts to upload the picture to a social media application (associated with matched content use restriction logic 206), matched content use restriction logic 206 identifies the location of the customer by accessing location database 510, and prevents the picture being uploaded to in-use content database 502.

Relationship database 512 may include information that indicates a type of relationship of a particular user to another user (e.g., a family member, a relative, a friend, a colleague, an acquaintance, a boss, an employee, an employer, a stranger, a licensor, a licensee, etc.). A user that has a particular type of relationship to another user may also have other types of relationships to the other user. For example, a user may be both a teacher and a friend to another user. A boss may also be a relative. In some cases, when a user has a particular type of relationship to another user, the user may be precluded from having another type of relationship to the other user. For example, a user may not be both a son and a daughter. As described above, matched content use restriction logic 206 may apply different restrictions to users having different types of relationship.

Figure 6:
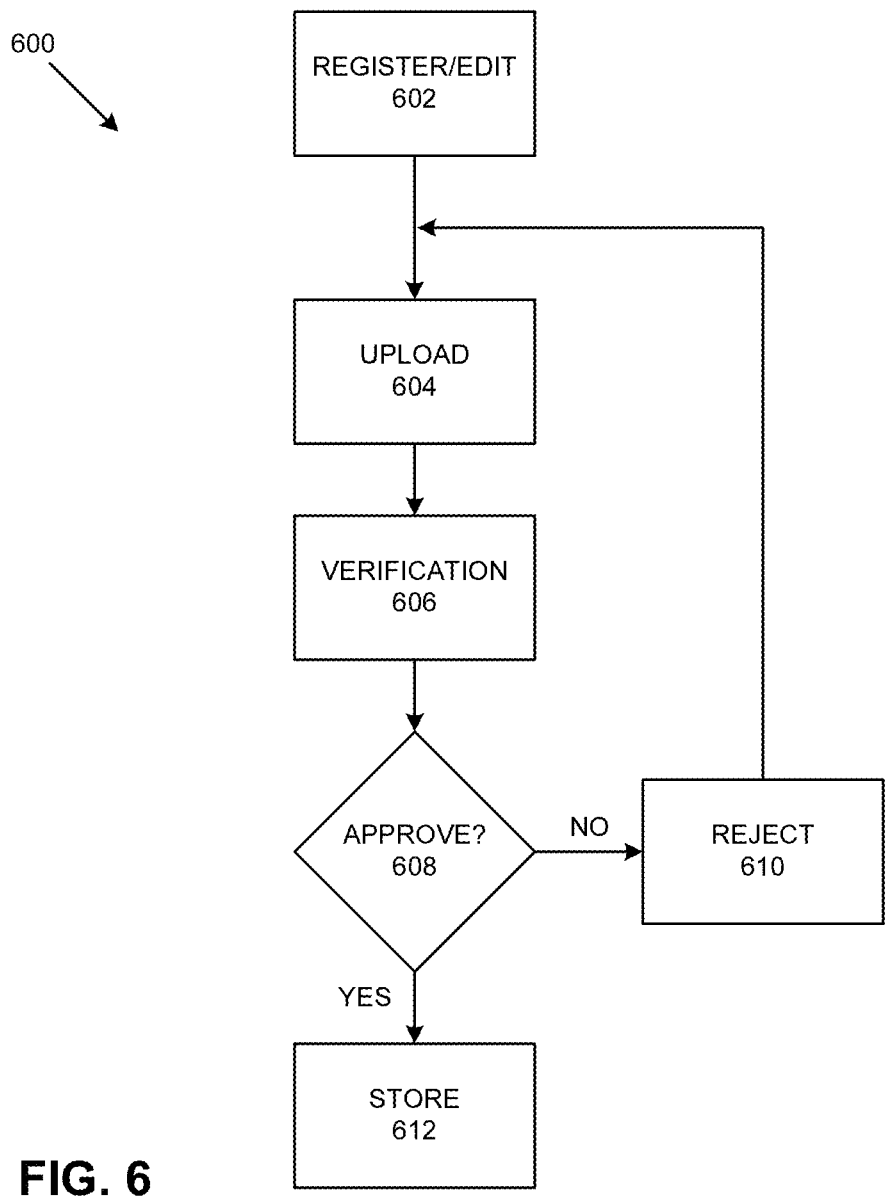
FIG. 6 is a flow diagram of an exemplary process for uploading a basis content item to the matched content use restriction system of FIG. 2.

FIG. 6 is a flow diagram of an exemplary process for uploading a basis content item at matched content use restriction system 104. Process 600 may be performed, for example, by matched content use restriction system 104. As shown, the upload may start with a user registering at matched content use restriction system 104 (block 602). Depending on the implementation, the user may register for free or for a fee in accordance with a specific level of service requested of matched content use restriction system 104. Depending on the implementation, the user may be required to provide billing information. In addition, the user may set user preferences, edit rules as described in reference to FIGS. 4 and 5, etc.

After the registration and/or setting user preferences, the user may upload a candidate content item (block 604). As already discussed, the candidate content item may be an image, audio, video, document, etc. As soon as the content item is uploaded, matched content use restriction system 104 may attempt to verify/validate the candidate content item (block 606).

For example, assume that a user has registered for a service in which the user's face would be prevented from being shown in in-use content of other users. In such an instance, matched content use restriction system 104 may request the user to provide an image of an identification card (e.g., driver's license) or another proof of the user's identity. Upon determining that the candidate image "belongs" to the user (e.g., a candidate image is an image of the user), matched content use restriction system 104 may validate the uploaded image of the user's face as a basis content item.

At block 608, if the uploaded content is not validated (block 608: no), the candidate content item is rejected (block 610), and the process may return to block 604, where the user may attempt to upload a different image. If the uploaded content is validated (block 608: yes), matched content use restriction logic 206 approves/validates the candidate content item for use as a basis content item, and stores the content item in basis content database 504.

Figure 7:
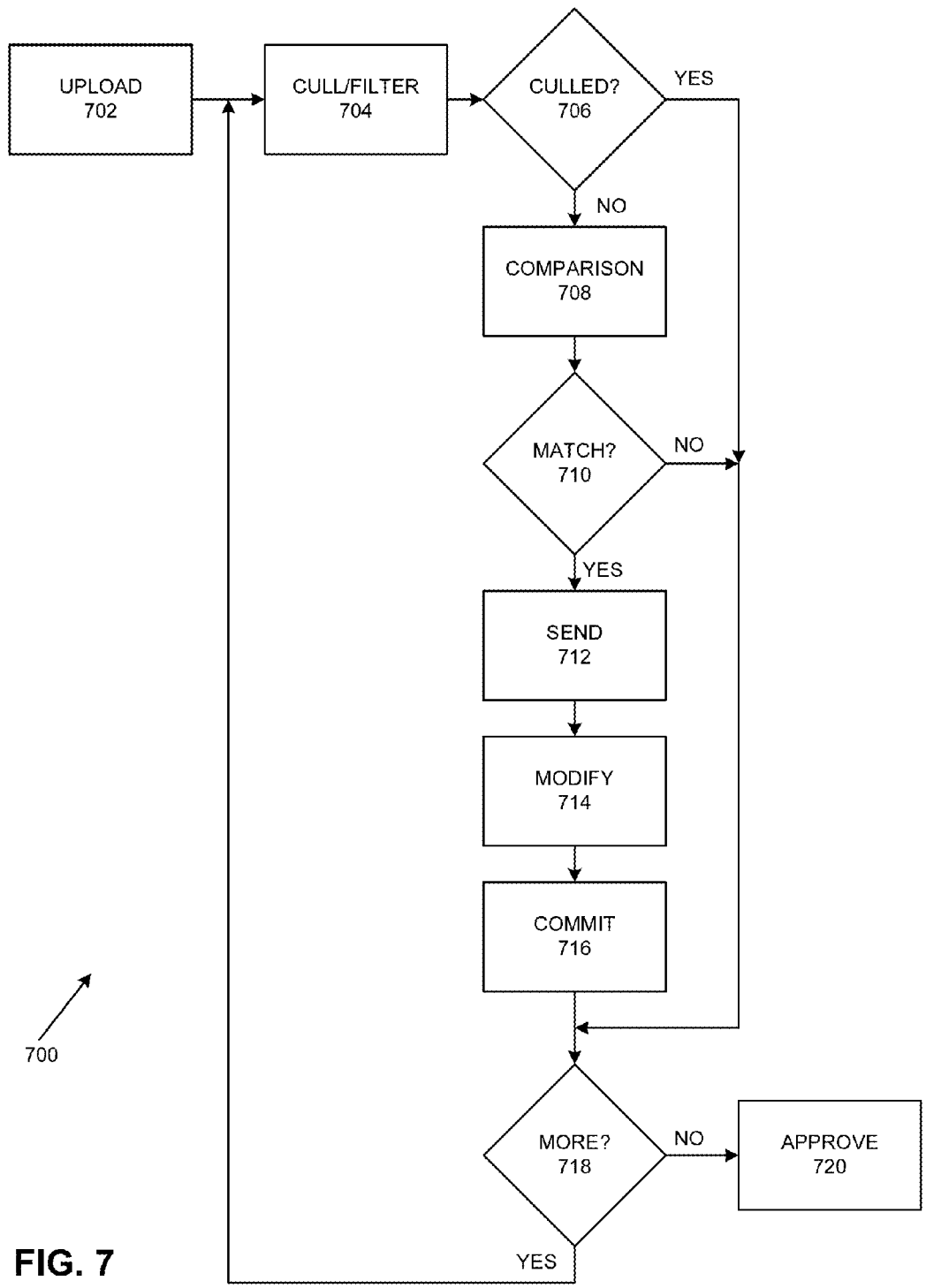
FIG. 7 is a flow diagram of an exemplary process for restricting the use of matched in-use content items according to one implementation.

FIG. 7 is a flow diagram of an exemplary process 700 for restricting the use of matched content according to one implementation. Process 700 may be performed, for example, by matched content use restriction system 104. In process 700, matched content use restriction system 104 may prevent the use of matched in-use content that is uploaded after the upload of a basis content item. As shown in FIG. 7, process 700 may include uploading a candidate in-use content item (block 702).

After the upload, matched content use restriction system 104 may determine, for each of the basis content items in basis content database 504, if the basis content item is to be culled or filtered out from being compared to the uploaded candidate in-use content item (block 704). A basis content item may be culled out (eliminated) if, for example: (1) the basis content item is of different types than the candidate in-use content item (e.g., audio, video, document, 3D object/image, etc.); (2) location and time requirements associated with the basis content item do not match the time and locations associated with the uploaded candidate in-use content item; (3) the owner of the basis content item has a type of relationship with the user that does not satisfy the requirements associated with the basis content item; and (4) other criteria, associated with the basis content item, are satisfied.

At block 706, if the basis content item is eliminated/culled out (block 706: yes), process 700 may proceed to block 718 associated with processing the next content item in basis content database. Otherwise (block 706: no), process 700 may proceed to block 708, where the content of the uploaded candidate in-use content item is compared to the content of the basis content item (block 708).

If there is no match (block 710: no), process 700 may proceed to block 718. Otherwise (block 710: yes), matched content use restriction system 104 may send a copy of the candidate in-use content item to a user/owner of the matching basis content item (block 712), so that the owner of the matching basis content item can modify the in-use content (block 714).

Thereafter, matched content use restriction system 104 may wait until the owner finishes modifying the candidate in-use content, or a time limit for modifying the candidate in-use content expires. Once the candidate in-use content item is modified or the time limit is exceeded, the changes (if any) may be committed to the uploaded candidate in-use content (block 716). At block 718, matched content use restriction system 718 may determine whether there are additional basis content items that may be compared to the uploaded candidate in-use content item, for further restriction. It is possible that more than one basis content item match the candidate in-use content item, and process 700 results in more than one modification of the candidate in-use content item.

In some implementations, prior to performing actions at blocks 712-716, matched content use restriction system 104 may determine whether the owner of the matched basis content item requires (e.g., via a setting in the user preferences) an automatic modification or a ban of the candidate in-use content item, rather than a manual modification by the owner. In such an instance, instead of performing actions at blocks 712-716, matched content use restriction system 104 may simply modify the candidate in-use content item, in accordance with rules or preference/settings of the owner of the matched basis content item.

At block 718, if there are no more basis content items to be compared to the candidate in-use content item, process 700 may terminate, with an approval of the candidate in-use content item (block 720) and by storing the candidate in-use content item in in-use content database 502.

Figure 8:
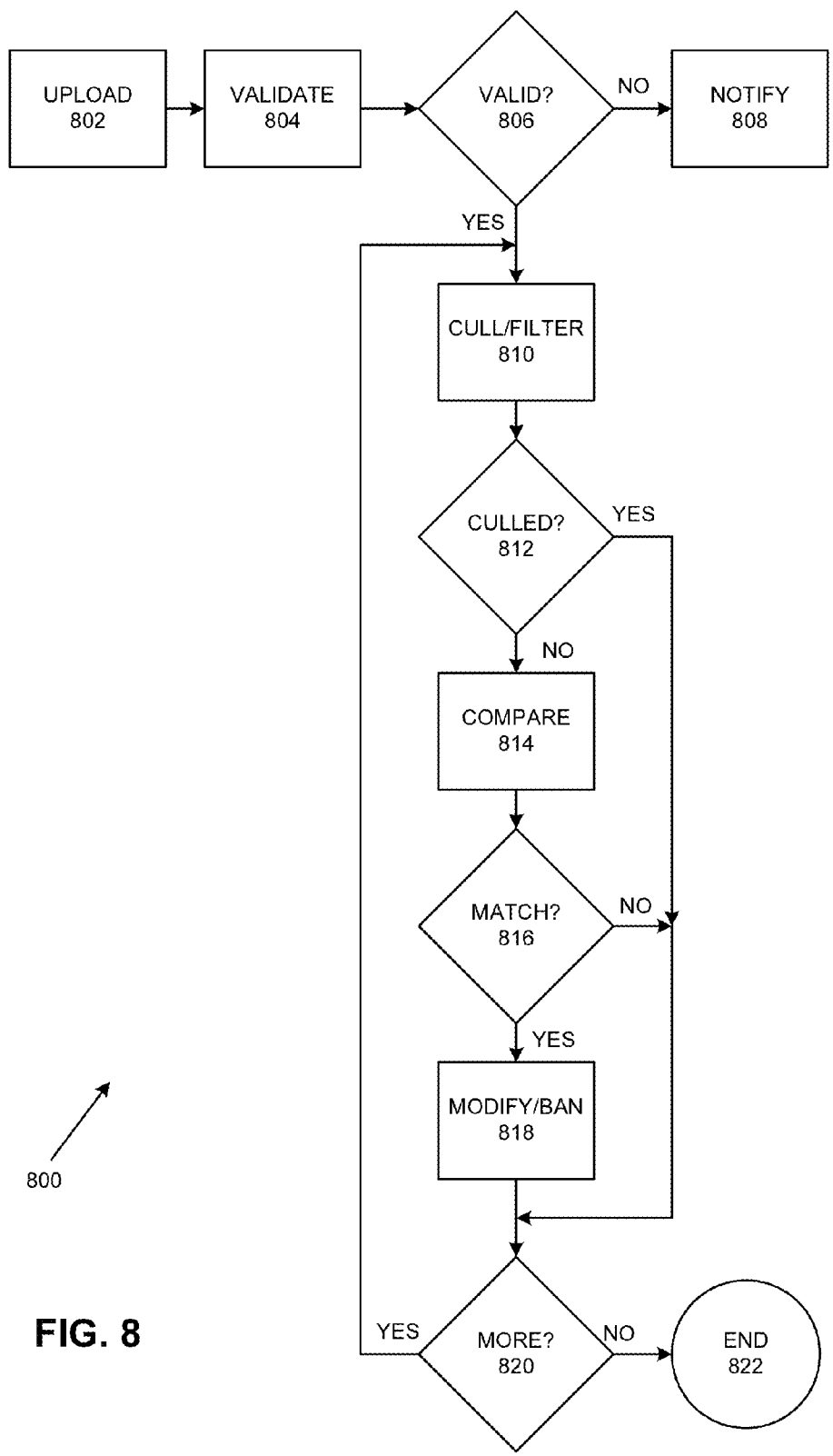
FIG. 8 is a flow diagram of another exemplary process for restricting the use of matched in-use content items according to another implementation.

FIG. 8 is a flow diagram of another exemplary process 800 for restricting the use of matched content according to another implementation. Process 800 may be performed, for example, by matched content use restriction system 104. In process 800, matched content use restriction system 104 may prevent the further use of matched content that already has been uploaded prior to the upload of a basis content item. As shown in FIG. 8, process 800 may include uploading a candidate basis content item (block 802).

Matched content use restriction system 104 may validate the uploaded candidate content item (block 804). If the uploaded content item is not validated (block 806: no), matched content use restriction system 104 may notify the user that uploaded the candidate content item, indicating that the candidate content item could not be validated (block 808).

If the content item is validated (block 806: yes), matched content use restriction system 104 may store the basis content item in basis content database 504, and schedule a process (see blocks 810-820) for examining each of in-use content items in in-use content database 502. The scheduled process may start with culling or filtering out the in-use content item from being compared to the uploaded candidate basis content item. The in-use content item may be culled out (eliminated) if: (1) the basis content item is of different types than the in-use content item (e.g., audio, video, document, 3D object/image, etc.); (2) the coordinates and time stamps associated with the basis content item do not match the coordinates and time stamps associated with the in-use content item; (3) the user that uploaded the basis content item has a type of relationship to the owner of the in-use content item that does not satisfy the requirements of the basis content item; and (4) other criteria, associated with the basis content item and much less computationally expensive than comparing the content items themselves are met. If the in-use content item is culled out (block 812: yes), matched content use restriction system 104 may proceed to block 820, to process additional in-use content items (block 820). Otherwise (block 812: yes), matched content use restriction system 104 may compare the basis content item to the in-use content item (block 814).

If the in-use content item does not match the basis content item (block 816: no), matched content use restriction system 104 may proceed to block 820. Otherwise (block 816: yes), matched content use restriction system 104 may allow the user (the one who uploaded the basis content item) to modify the in-use content item in a limited amount of time (block 818). In different embodiments or with a different setting, matched content use restriction system 104 may either automatically modify the in-use content item, or alternatively, give the owner of the in-use content item an opportunity to purchase a right to use the in-use content item.

From bock 818, matched content use restriction system 104 may proceed to block 820, to process additional in-use content items in in-use content database 502 (block 820). If there are additional in-use content items to process (e.g., compare to the basis content item) (block 820: yes), matched content use system 104 may return to block 810. Otherwise (block 818: no), process 800 may terminate.

Figure 9A:
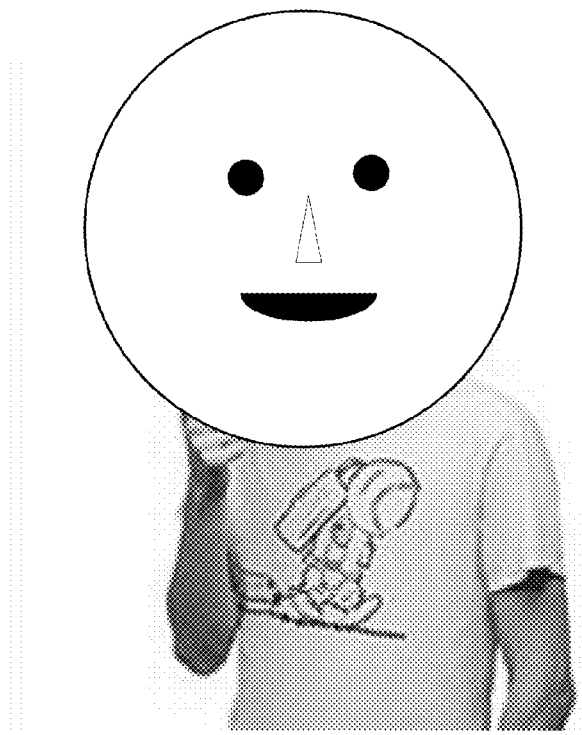
FIGS. 9A and 9B illustrate different ways in which images may be modified during the processes of FIG. 7 and FIG. 8.
Figure 9B:

FIGS. 9A and 9B illustrate different ways in which images may be modified processes 700 and 800. Assume that a registered user has uploaded an image of a face to matched content use restriction system 104. Also assume that another user uploads two pictures that include the image of the face to system 104. Accordingly, matched content use restriction system 104 may replace the image of the face, in one of the pictures, with another image (e.g., a smiley face), as illustrated in FIG. 9A. Alternatively, matched content use restriction system 104 may blur the image of the face, as illustrated in FIG. 9B.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, at blocks 706 and 812, a first content item may be culled/eliminated if the candidate content item (to which the first content item is to be compared) is not of the same type as the candidate content item. In other systems, the other content item may be eliminated or culled if the other content item cannot be easily converted into another format to be compared to the candidate content item.

In another example, while series of blocks have been described with regard to the exemplary process(es) illustrated above, the order of the blocks and messages may be modified in other implementations. In addition, non-dependent blocks may represent acts that can be performed in parallel to other blocks. Furthermore, one or more of the blocks may be omitted in other implementations.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments and implementations collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   storing a basis content item, uploaded by a first device, to a system;
   receiving, at the system, an upload, from a second device, of a candidate in-use content item;
   determining whether the candidate in-use content item matches the basis content item;
   in response to determining that the candidate in-use content item does not match the basis content item, storing the candidate in-use content item at the system; and
   in response to determining that the candidate in-use content item matches the basis content item, modifying the candidate in-use content item, wherein modifying the candidate in-use content item includes:
   sending a request, to a user of the first device, to modify a copy of the candidate in-use content item within a span of time;
   receiving, from the user of the first device, a modified copy of the candidate in-use content item; and
   in response to receiving the modified copy of the candidate in-use content item from the user of the first device, storing the modified copy in an in-use content database of the system.

2. The method of claim 1, wherein modifying the candidate in-use content item further includes:
   providing a user of the second device with a read privilege, a write privilege, and an execution privilege for the modified copy.

3. The method of claim 1, wherein the candidate in-use content item includes at least one of:
   an image, text, video data, or audio data.

4. The method of claim 1, wherein the candidate in-use content item includes an image and the basis content item includes text, and
   wherein determining whether the candidate in-use content item matches the basis content item includes converting the candidate in-use content item into text.

5. The method of claim 1, wherein the candidate in-use content item includes a first image that includes a second image and the basis content item includes the second image, and
   wherein the modified copy of the candidate in-use content item includes a portion of the first image and does not include the second image.

6. The method of claim 1 further comprising:
   prior to determining whether the candidate in-use content item matches the basis content item, uploading the basis content item to the system as a candidate basis content item;
   determining whether the user of the first device, who is associated with the candidate basis content item, has a right to restrict a use of content of the candidate basis content item;
   in response to determining that the user of the first device has the right, storing the candidate basis content item as the basis content item in the system; and
   providing write and execute privileges for the basis content item to the user of the first device.

7. The method of claim 6, wherein determining whether the user of the first device has a right to restrict a use of the content of the candidate basis content item includes:
   determining whether the content of the basis content item is already stored in one or more basis content items in the system.

8. The method of claim 6, wherein determining whether the user of the first device has a right to restrict the use of the content of the candidate basis content item includes:
   determining whether the user of the first device has subscribed to the system for a service that permits the user of the first device to restrict a use of a particular type of content in the basis content item.

9. The method of claim 1, wherein the basis content item is stored in a basis content database, and wherein the method further comprises, prior to an upload of any basis content item, seeding the basis content database with a set of basis content items.

10. The method of claim 1, further comprising:
    determining whether to determine whether the candidate in-use content item matches a basis content item, based on at least one of:
    a time associated with the basis content item;
    a location associated with the basis content item;
    a type of content of the basis content item and a type of content of the candidate in-use content item; or
    a type of relationship between the user of the first device and a user of the second device.

11. The method of claim 10, wherein the user of the second device is related to the user of the first device as:
    a colleague of the user of the first device; or
    an employee.

12. The method of claim 1, wherein determining whether the candidate in-use content item matches the basis content item includes:
    determining whether an image, of a face of the user of the first device, that is included in the basis content item is included in the candidate in-use content item.

13. A social media system comprising:
    a memory configured to store a plurality of images; and
    a device configured to:
    receive an upload, from a first user device, of a basis image to the social media system;
    store the basis image in the memory;
    receive an upload, from a second user device, of a candidate in-use image to the social media system;

determine whether a portion of the candidate in-use image matches a portion of any image of the plurality of images or a portion of the basis image;

in response to determining that the portion of the candidate in-use image does not match the portion of any image of the plurality of images or the portion of the basis image, store the candidate in-use image in the memory;

in response to determining that the portion of the candidate in-use image matches the portion of the basis image, modify the portion of the candidate in-use image to generate a second candidate in-use image, wherein, when modifying the portion of the candidate in-use image, the device is configured to:

send a copy of the candidate in-use image to a user of the first user device to be modified, and receive, from the first user device, the second candidate in-use image, wherein the portion is modified in the second candidate in-use image; and store the second candidate in-use image in the memory.

14. The social media system of claim 13, wherein the portion of the candidate in-use image includes an image of a face.

15. The social media system of claim 13, wherein the device is further configured to:

determine whether, when the portion of the basis image matches the portion of the candidate in-use image, the user of the first user device has a right to modify the candidate in-use image; and in response to determining that the user of the first user device has the right to modify the candidate in-use image, store the basis image in the social media system.

16. A system comprising:

one or more memories to store instructions; and one or more processors configured to execute the instructions to:

receive an upload, from a first user device, of a basis content item that includes first content;

determine whether a first user of the first user device has a right to restrict a use of the first content in an in-use content item uploaded by a second user device when the in-use content includes the first content;

in response to determining that the first user has the right, store the basis content in the system;

in response to determining that the first user does not have the right, discard the basis content;

receive an upload, from a second user device, of a first in-use content item;

determine whether the first in-use content item matches the basis content item;

in response to determining that the first in-use content item does not match the basis content item, store the first in-use content item in the system, without restricting a use of the first in-use content item by a second user of the second user device; and in response to determining that the first in-use content item matches the basis content item:

send a copy of the first in-use content item to the first user device to be modified;

receive, from the first user device, a modified in-use content item; and upon receipt of the modified in-use content item, replace the first in-use content item with the modified in-use content item.

17. The system of claim 16, wherein the system includes: a social media system.

18. The method of claim 1, wherein the modified copy of the candidate in-use content item includes a watermarked copy of the candidate in-use content item.

19. The social media system of claim 13, wherein the second candidate in-use image includes the candidate in-use image with the portion obscured.

20. The system of claim 16, wherein the modified in-use content item includes a watermarked copy of the first in-use content item.

* * * * *